(12) United States Patent
Ogino

(10) Patent No.: US 7,743,472 B2
(45) Date of Patent: Jun. 29, 2010

(54) BOOT BAND

(75) Inventor: Takashi Ogino, Nagano (JP)

(73) Assignee: NHK Spring Co., Ltd. (JP)

( * ) Notice: Subject to any disclaimer, the term of this patent is extended or adjusted under 35 U.S.C. 154(b) by 0 days.

(21) Appl. No.: 10/513,917

(22) PCT Filed: Jun. 5, 2003

(86) PCT No.: PCT/JP03/07159

§ 371 (c)(1),
(2), (4) Date: Nov. 10, 2004

(87) PCT Pub. No.: WO03/104686

PCT Pub. Date: Dec. 18, 2003

(65) Prior Publication Data

US 2005/0173872 A1 Aug. 11, 2005

(30) Foreign Application Priority Data

Jun. 6, 2002 (JP) ............................ 2002-165900

(51) Int. Cl.
F16L 33/02 (2006.01)

(52) U.S. Cl. .................. 24/20 R; 24/20 CW; 24/20 TT

(58) Field of Classification Search ................ 24/20 R, 24/20 CW, 20 EE, 20 TT, 20 W; 464/173, 464/175

See application file for complete search history.

(56) References Cited

U.S. PATENT DOCUMENTS 4,910,832 A * 3/1990 Schaub et al. ............... 24/20 R
RE35,384 E * 12/1996 Oetiker ........................ 24/20 R
5,613,281 A * 3/1997 Oetiker ........................ 24/20 R
5,615,456 A 4/1997 Oetiker
6,345,551 B1 * 2/2002 Oetiker ..................... 74/570.2

FOREIGN PATENT DOCUMENTS

JP 08-170773 7/1996
JP 2002013681 A * 1/2002
WO WO 0070260 A1 * 11/2000

OTHER PUBLICATIONS

Japanese Publication of unexamined utility model application No. Showa 59 (1984)—169409, Publication Date: Nov. 13, Showa 59 (1984). Applicant: Kato Hatsujo Co., Ltd.

* cited by examiner

Primary Examiner—James R Brittain
(74) Attorney, Agent, or Firm—Lowe Hauptman Ham & Berner, LLP

(57) ABSTRACT

A boot-band that (a) does not excessively clamp a boot, (b) can prevent leakage of grease from the boot and the boot-band, and (c) uniformly produces a tight contact force on the boot without deteriorating the contact force on the boot. This boot-band includes a metallic belt-shaped member (2), and its clamping force, which is generated in the direction that shortens the circumference of the metallic belt-shaped member (2), is exercised under a ring-shaped condition in such a way that one end of the metallic belt-shaped member overlaps the other end thereof, and in such a way that both ends are wound around the outer periphery of the boot. A smaller-cross-sectional area (5a) is formed in a part of the belt-shaped member (2); the smaller-cross-sectional area (5a) and the general part (8), whose cross-sectional area is not reduced, are elongated due to plastic deformation caused by the clamping force.

16 Claims, 6 Drawing Sheets

<<Hardness distribution in the X–X cross-section>>

BOOT BAND

CROSS-REFERENCE TO RELATED APPLICATIONS

The present application is based on International Application No. PCT/JP03/07159, filed on Jun. 5, 2003, which in turn corresponds to JP 2002-165900 filed on Jun. 6, 2002, and priority is hereby claimed under 35 USC §119 based on these applications. Each of these applications are hereby incorporated by reference in their entirety into the present application.

FIELD OF THE INVENTION

This invention relates to a boot-band, such as one made of rubber, resin, or the like, that is used for fixing a boot on a connecting member.

BACKGROUND OF THE INVENTION

A boot-band is used for fixing onto a metallic member a boot that is hooked between metallic members such as a power-transmission shaft. It is used, for example, for a constant-velocity joint and the like of an automobile. In a constant-velocity joint of an automobile, a boot is hooked between shafts while holding grease inside, and the boot is clamped from the outside by the boot-band and brought into close contact with the shaft in order to prevent the grease from flowing outside between the boot and the shafts.

Because such boots, shafts, and boot-bands might have dimensional errors at the time of manufacturing, the tolerance thereof needs to be made acceptable. A boot-band that has acceptable tolerance is disclosed in Japanese Unexamined Published Patent Application No. H8-170773. An opening that extends in the longitudinal direction of a band body is punched into this boot-band. Because the cross-sectional area is reduced at the portion formed with said opening, resistance against elastic elongation under a tensile load is decreased at the time of clamping. That is to say, the opening-formation part of this boot-band is elastically deformed and elongated by clamping, and tolerance is adjusted by elongation of said opening-formation part at this elastic area.

However, when a boot-band such as that described in Japanese Unexamined Published Patent Application No. H8-170773 is elongated at the elastic area, the load on the boot is increased, as a result of which the boot might be excessively clamped and might even be broken.

Because the boot-band is elongated at the elastic area, the opening needs to be elongated in order to secure a wide range of tolerance-adjustment capability. However, because adhesiveness to the boot is reduced at the opening-formation part when the opening is made long, the clamping force at the opening-formation part is insufficient, and as a result the sealing property is deteriorated and grease leakage occurs, which creates problems.

As described above, a conventional boot-band only adjusts tolerance, and it can neither prevent breakage of the boot nor provide a stable and secure sealing. In consideration of such problems of the prior art, one objective of this invention is to provide a boot-band that not only can adjust tolerance, but that also can secure stable sealing while preventing breakage of the boot.

SUMMARY OF THE INVENTION

To achieve the aforementioned objective, an embodiment of the invention is a boot-band that is made of a metallic belt-shaped member and that maintains a clamping condition on a boot by applying a clamping force in a direction such that the circumference of the metallic belt-shaped member is shortened and in a ring-shaped condition, and such that said belt-shaped member winds around the outer periphery of a boot so that one end of said belt-shaped member overlaps the other end, whereby there is formed at a part of said belt-shaped member a part that has a smaller cross-sectional portion than the remainder of said belt-shaped member, with both the smaller-cross-sectional portion and the general part whose cross-sectional portion is not decreased are plastically deformed and elongated by said clamping force.

The boot-band of this invention can clamp a boot while maintaining a clamping condition on the boot by exercising the clamping force in a way so as to shorten the boot-band's length under a condition that the belt-like boot-band is shaped like a ring.

According to an aspect of the invention, because, at the time of clamping, both the smaller-cross-sectional area and the general part are elongated by plastic deformation, a wide range of tolerance can be obtained. In addition, because the boot is not excessively clamped at the plastic deformation area, breakage of the boot can be prevented. Also, because both the smaller-cross-sectional area and the general part are elongated, elongation does not need to be borne only by the smaller-cross-sectional area. Thus, the smaller-cross-sectional area does not need to be elongated, adhesiveness to the boot can be secured, and stable and good sealing becomes possible.

According to another aspect of the invention, said belt-shaped member has characteristics that satisfy the following Conditions 1 and 2.

Condition 1: The tension that arises due to the boot-reaction force that (a) is caused by clamping and (b) acts on the smaller-cross-sectional area, is equal to or greater than the yield-point load of the general part.

Condition 2: The cross-sectional area of the smaller-cross-sectional area multiplied by the breaking strength of the smaller-cross-sectional area is equal to or greater than the cross-sectional area of the general part multiplied by the yield-point strength of the general part.

Condition 1 is a condition for elongating the belt-shaped general part by plastic deformation, and Condition 2 is a condition for preventing breakage of the smaller-cross-sectional area. Accordingly, when said Conditions 1 and 2 are satisfied, the same effects can be obtained.

According to another aspect of the invention the cross-sectional area of the smaller-cross-sectional area under said Condition 2 is calculated by multiplying the rate of change of the yield point of the material due to the material's hardening due to processing of said smaller-cross-sectional area.

When the smaller-cross-sectional area is formed by processing such as punching, the smaller-cross-sectional area hardens at the time of processing. According to this aspect of the invention, because Condition 2 is set taking into consideration (1) the rate of change of the yield point, with said rate varying according to the hardening process, and (2) the cross-sectional area of the smaller-cross-sectional area, the adhesiveness force can act on the boot even more effectively.

According to a further aspect of the invention, said smaller-cross-sectional area is formed in the outer overlapping portion of the boot-band.

Thus, the smaller-cross-sectional area is positioned at the outer overlapping portion of the boot-band and, as a result, the smaller-cross-sectional area does not contact the boot. As a result, the smaller-cross-sectional area does not bite into the boot.

DESCRIPTION OF THE PREFERRED EMBODIMENTS

Figure 1:
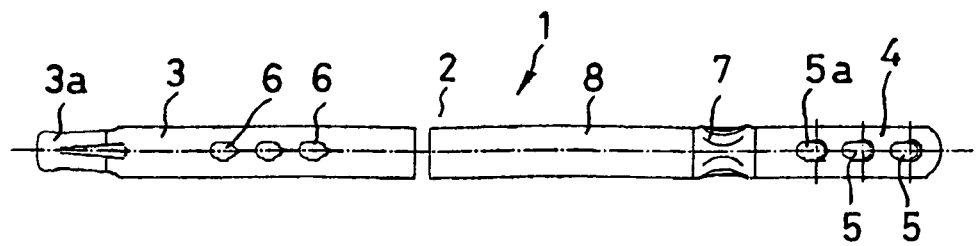
FIG. 1 is a plan view of the boot-band in Embodiment 1 of the present invention.

The present invention will now be explained concretely with reference to embodiments illustrated in the drawings. In each embodiment, the same number is used to refer to the same member.

Embodiment 1

Figure 2:
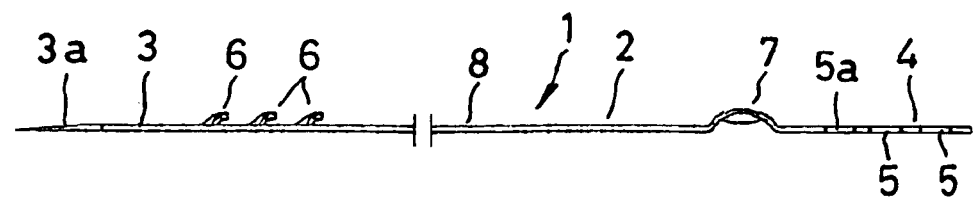
FIG. 2 is a side elevation view of the boot-band of Embodiment 1.
Figure 3:
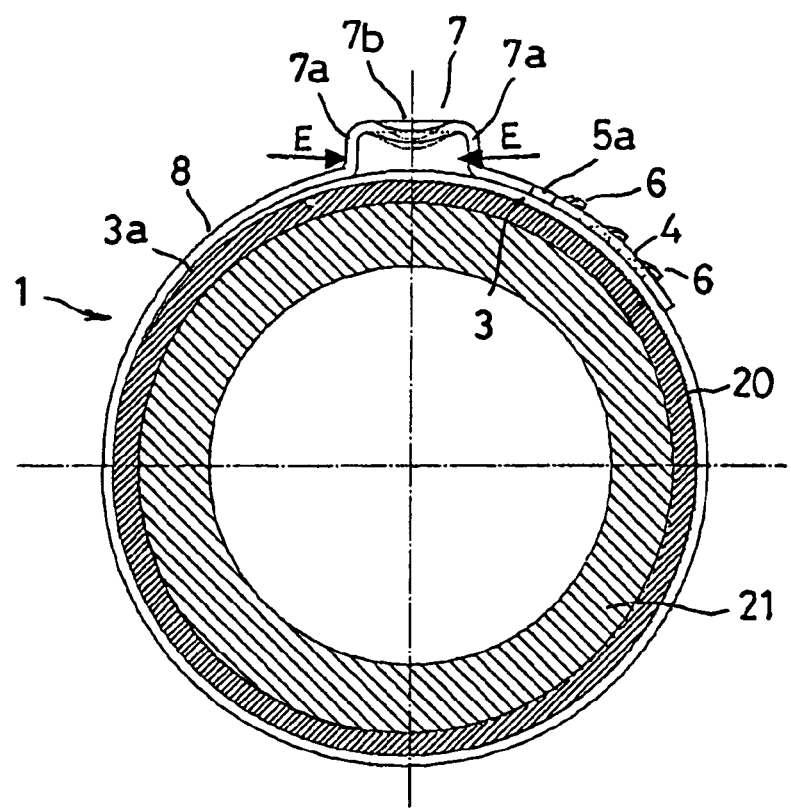
FIG. 3 is a cross-section view of the boot-band of Embodiment 1 before clamping.

FIGS. 1 through 8 relate to a boot-band 1 in Embodiment 1 of the present invention. FIG. 1 is a plan view of the boot-band FIG. 2 is a side elevation view thereof; and FIG. 3 is a cross-sectional view of a boot-band 1 when it is wound around a boot 20.

Figure 4:
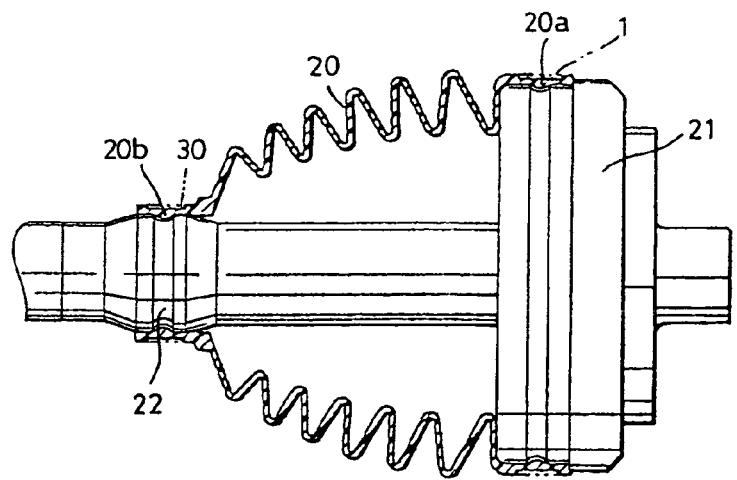
FIG. 4 is a cross-section view showing the boot-band when it is being used.

The boot-band 1 has a belt-shaped member 2 that is made of a metal such as stainless steel, and that is formed into a thin horizontal shape. As shown in FIG. 3, the belt-shaped member is wound around the boot 20 so as to surround the boot 20 like a ring. At the time of winding, the belt-shaped member 2 is in such a condition that an outer portion 4 is overlapped onto the inner portion 3 of the belt-shaped member 2 that is in contact with the outer periphery of the boot 20. In addition, as shown in FIG. 4, the boot 20 is used so as to cover a metallic member 21 such as a shaft.

A plurality (three in this embodiment) of engagement holes 5 (in FIGS. 1 and 2), 5a (in FIGS. 1, 2, and 3) are formed in the outer overlap portion 4 by punching. Engagement prominences 6 that are to be engaged with the engagement holes 5, 5a are formed, in the same number as the number of engagement holes, so as to project toward the inner portion 3 of the belt-shaped member 2. The engagement prominences 6 are engaged with the engagement holes 5, 5a, so that the belt-shaped member 2 can maintain a ring condition.

An ear portion 7 as a clamp means is projected outside the ring in the radial direction on the outer overlap portion 4 and near to the engagement prominences 6. The ear portion 7 is formed of a pair of (1) leg portions 7a that rise from the belt-shaped member 2, and (2) a bridge portion 7b that connects the two leg portions 7a. A clamping force is applied on each of the two leg portions 7a in a direction (the directions of the arrows E in FIG. 3) so as to shorten the ring-like length of ear portion 7, so that the entire ear portion 7 is deformed. Because of this deformation, the boot-band 1 can maintain a clamping condition on the boot 20.

Also, a thin part 3a whose thickness gradually decreases is formed at the opening-side end of the inner portion 3. Because of this thin part 3a, the overall length of the inner portion 3 of the belt-shaped member 2 can be brought into tight contact with the outer periphery of the boot 20, so that the boot 20 can be constantly clamped.

The belt-shaped member 2 includes a portion where its cross-sectional area is made smaller. A portion of the belt-shaped member 2 other than the smaller-cross-sectional area is a general part 8 whose cross-sectional area is not made small. In this embodiment, the engagement hole 5a that is positioned among a plurality of engagement holes on the side of the ear portion 7 helps to create the smaller-cross-sectional area. The other engagement holes 5 cannot help to create the smaller-cross-sectional area that is capable of such elongation as intended in the present invention, because they are engaged with and nipped by the engagement prominences 6, which are made of a rigid material. The engagement hole 5a is formed in the outer overlap portion 4, so that it is not brought into contact with the boot 20, and therefore it is prevented from biting into the boot 20.

The aforementioned embodiment is configured so that by applying a clamping force E in two directions (as shown in FIG. 3) so as to shorten the length on the ear portion 7, the engagement hole 5a is elongated in the longitudinal direction of the belt-shaped member 2, and the general part 8 also is elongated in the same direction by plastic deformation.

Said configuration is made based on Conditions 11 and 12, which are presented below.

Condition 11: The tension that arises due to the boot-reaction force that (a) is caused by clamping and (b) acts on the smaller-cross-sectional area (which includes engagement hole 5a) is equal to or greater than the yield-point load of the general part 8.

Condition 12: The cross-sectional area of the smaller-cross-sectional area (an engagement hole 5a) multiplied by the breaking strength of the smaller-cross-sectional area (which includes engagement hole 5a) is equal to or greater than the cross-sectional area of the general part 8 multiplied by the yield point strength of the general part.

Because of Condition 11, the general part 8 can be elongated by plastic deformation when the boot-reaction force acts on the boot-band 1. Also, because of Condition 12, breakage of the smaller-cross-sectional area (which includes engagement hole 5a) can be prevented. Accordingly, said Conditions 11 and 12 result in both the smaller-cross-sectional area (which includes engagement hole 5a) and the general part 8 being elongated. Thus, the boot 20 can be clamped without causing the smaller-cross-sectional area (which includes engagement hole 5a) to break.

The aforementioned conditions will now be explained further, using concrete numeric values. FIG. 4 shows a cross-section of a constant-velocity joint of an automobile, where this embodiment is applied, and where the boot 20 is hooked to metallic members 21 and 22, both constituting a shaft. The fixing-portion end 20a of the boot 20 is made to cover the metallic member 21, and the other fixing-portion end 20b is made to cover the metallic member 22, so that the boot 20 is hooked to these metallic members 21 and 22, and so that grease is retained inside the boot. The boot-band 1 of this embodiment is used for clamping the fixing-portion end 20a of the boot 20 on the side of the metallic member 21.

The belt-shaped member 2 of the boot-band 1 is 1 mm thick, 10 mm wide, and has a radius of 35 mm when it is in the form of a ring, and the distance between the pair of leg portions 7a, of the ear portion 7 is 10 mm. Also, the engagement holes 5, 5a are 3.5 mm wide and 7 mm long. Stainless steel having a yield-point load of 220 N/mm$^2$, a breaking strength of 690 N/mm$^2$, and breaking elongation of 60%, is used as the material of the belt-shaped member 2. Polyester elastomer having a hardness of 47 D is used for the boot 20. The thickness of the fixing-portion end 20a of the boot-band 1 is about 1.25 mm, the contact force required to prevent grease leakage is 1.5 N/mm$^2$, and the contact force at which the boot 20 breaks is 6 N/mm$^2$.

In order to clamp the boot 20, the engagement holes 5, 5a are hooked and engaged with the engagement prominences 6, so that the boot-band 1 is wound around the boot 20 in a ring shape as shown in FIG. 3. The leg portions 7a of the ear portion 7 are clamped on each side in the directions shown by the arrows E in FIG. 3, using a tool dedicated for this purpose, so that the boot is clamped so as to shorten its length. Thereby, the fixing-portion end 20a of the boot 20 is compressed and brought into close contact with the outer face of the metallic member 21.

Figure 5:
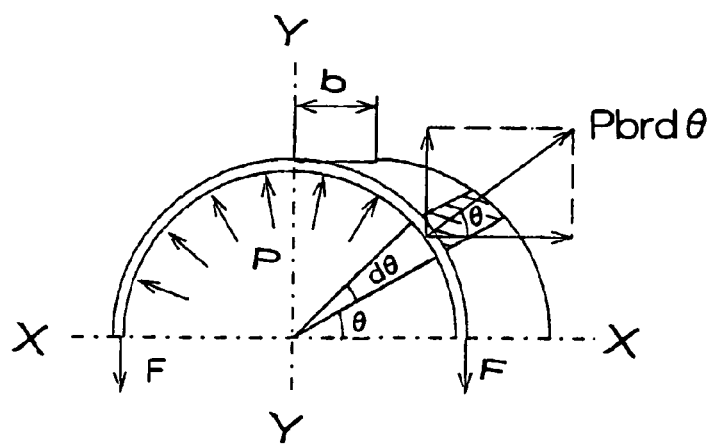
FIG. 5 is a plan view that explains the adhesion force that acts on a boot-band.

The length is shortened by plastically deforming the ear portion 7, and as a result, the reaction force from the boot 20 acts to generate a load for elongating the boot-band 1 (the belt-shaped member 2). FIG. 5 is intended for use in calculating the force for elongating the boot-band 1 along the cross-section X-X. This calculation assumes that the frictional force between the boot 20 and the boot-band 1 is not taken into consideration.

When the radius of the boot-band 1 at the time of clamping is designated as r (mm), the load f applied to a micro-angle dθ by the contact force P (N/mm$^2$) that is generated at the time of clamping the boot-band 1 is expressed as follows:

$f = P \times$ arc length of $d\theta \times$ width $b$ of the boot-band $= Pbrd\theta$ The load F (load for elongating the boot-band 1) that is generated between X-X can be determined by integrating the load f (as a Y-direction component that is orthogonal to X) using the following Equation 1 with regard to X-Y:

$$F = \int_0^{\pi/2} pbr\sin\theta\, d\theta = Pbr[\cos\theta]_0^{\pi/2} = Pbr \quad \text{(Equation 1)}$$

Because the length of the cross-section X-X is one-half the length of the boot-band 1, the load G that acts on the entire boot-band 1 is expressed as follows:

G=2F=2Prb

Figure 6:
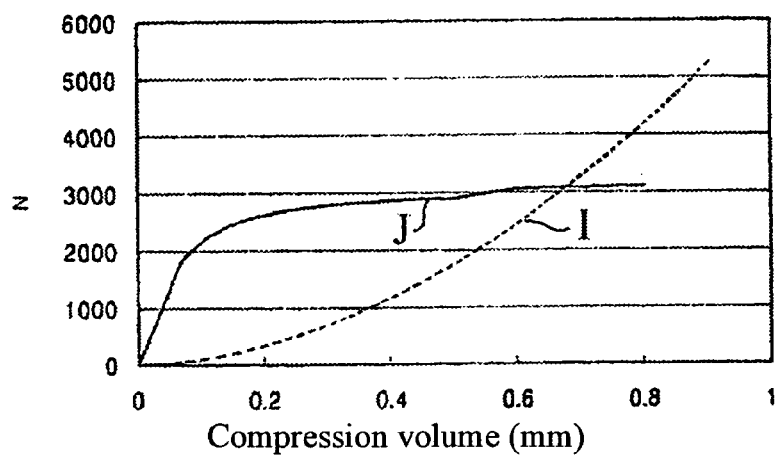
FIG. 6 is a graph that shows the boot-reaction force and tensile strength in Embodiment 1.

FIG. 6 is a graph in which the vertical axis indicates (1) the load of a boot-reaction force that elongates the engagement hole 5a that is part of the smaller-cross-sectional area, and (2) the tensile strength of the smaller-cross-sectional area that includes the engagement hole 5a that resists the load, and in which the horizontal axis indicates (3) the compression volume of the boot 20, which corresponds to the load of the boot-reaction force and the tensile strength of the smaller-cross-sectional area that includes the engagement hole 5a. In FIG. 6, the curve I shows the load, which is applied by the boot's reaction force, for elongating the engagement hole 5a; and the curve J shows the tensile strength of the smaller-cross-sectional area that includes the engagement hole 5a. In FIG. 6, because, at an initial stage of compression intended to clamp the ear portion 7, the load I for elongating the engagement hole 5a does not exceed the yield-point load of the engagement hole 5a—that is, because the tensile strength of the smaller-cross-sectional area that includes the engagement hole 5a is larger than the load for elongating the engagement hole 5a applied by the boot-reaction force—the boot-band 1 can be clamped so as to compress the boot 20.

When the clamping volume on the ear portion 7 is increased so that the compression volume of the boot 20 is increased, the boot-reaction force is increased as well, and thus the load I acting on the engagement holes 5a also increases. When the load exceeds the yield-point load of the engagement holes 5a, the engagement hole 5a is elongated because plastic deformation occurs. After elongation due to plastic deformation has begun, the engagement hole 5a continues to elongate and the compression volume on the boot 20 hardly increases, even if the clamping volume to the ear portion 7 is further increased, and, as a result, the boot 20 cannot be compressed further.

The boot compression volume at the time that the hole starts to elongate due to plastic deformation determines the cross-sectional area of the engagement hole 5a of the boot-band 1. The boot compression volume is set to such a value that (1) a contact force that is large enough to prevent the grease inside the boot from leaking, is secured, and (2) the boot 20 is not damaged. In this embodiment, the contact force required to prevent leakage of the grease is 1.5 N/mm$^2$. Because the band's radius is 35 mm, the load G for elongating the boot-band 1 is calculated—using the formula G=2Prb— as follows:

G=2×1.5×35×10=1050 N

Because the engagement hole 5a is formed by punching the belt-shaped member 2, the yield point of the material rises due to the hardening work, as a result of which the hardness of the periphery of the engagement hole 5a increases. Accordingly, with regard to the cross-sectional area of the engagement hole 5a under the aforesaid Condition 2, the rise of the yield point due to the hardening work needs to be taken into consideration.

Figure 7:
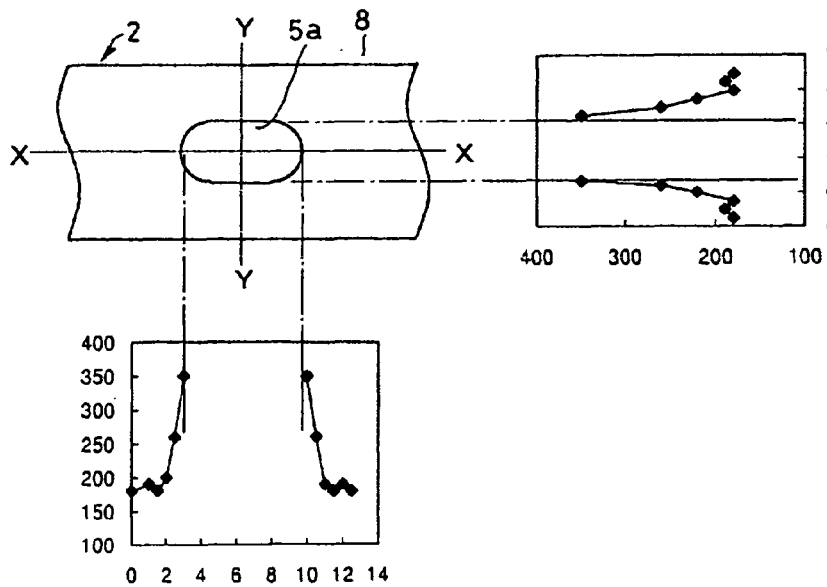
FIG. 7 is a plan view and two graphs that show the change of the yield point caused by work hardening.

FIG. 7 shows the change in hardness around the engagement hole 5a due to the hardening work. In the case of stainless steel, the rate of change of hardness and the rate of change of the yield point have the same tendency. From this, and as shown in FIG. 7, the yield point around the engagement hole 5a is increased by 25% on average, and the yield-point load is calculated as 220×1.25=275 N/mm$^2$. Accordingly, the required cross-sectional area around the engagement hole 5a, which tightly contacts the boot 20, is calculated as 1050 N/275=3.82 mm$^2$. Because the thickness of the belt-shaped member 2 is 1 mm, the width required on each side of the engagement hole 5a is 1.91 mm (a total of 3.82 mm for both sides). The engagement hole 5a must have a cross-sectional area of this value or more in order to be able to apply a contact force that is great enough to prevent the leakage of grease from the boot. From the above, it can be said that the width of the engagement hole 5a must be less than 6.18 mm.

If only the engagement hole 5a continues to elongate after the contact force has reached a level where grease leakage is prevented, the smaller-cross-sectional area (which includes the engagement hole 5a) reaches a level of too much elongation, and it breaks. Therefore, the aforementioned Conditions 1 and 2 are set so that the general part 8 also elongates due to plastic deformation (and so that elongation of only the engagement hole 5a is prevented).

In this case, the distance between the leg portions 7a of the ear portion 7 is 10 mm, and the clamping force acting on the boot-band 1 increases until these leg portions 7a are brought into tight contact with each other (at a maximum clamping length of 10 mm). For example, when the radius of the boot before clamping is 31 mm, and the clamping length of the boot 20 is 0.5 mm when the leg portions 7a are brought into tight contact with each other (i.e., the interval between the leg portions 7a becomes 0 mm), the elongation of the belt-shaped member 2 as a whole is calculated as $10-\pi \times 0.5 \times 2 = 6.86$ mm. Assuming that there is no engagement hole 5a as a part of a smaller-cross-sectional area and that the belt-shaped member 2 elongates as a whole, the elongation is calculated as $2 \times \pi \times 31 = 195$ mm. Inasmuch as the belt-shaped member 2 elongates by 6.86 mm, the elongation rate is calculated as $6.86/195 = 3.5\%$. If this elongation is borne only by the engagement hole 5a, the elongation rate becomes 6.86 mm/7 mm (the length of the engagement hole 5a)=98%, which is an elongation rate that exceeds the breaking-elongation-rate of 60% and, as a result, the smaller-cross-sectional area (which includes the engagement hole 5a) breaks.

Figure 8:
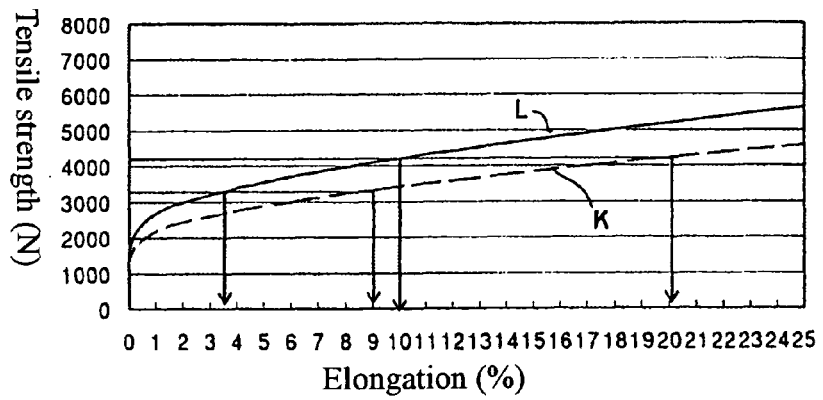
FIG. 8 is a graph that shows the elongation of a boot-band in Embodiment 1.
Figure 9:
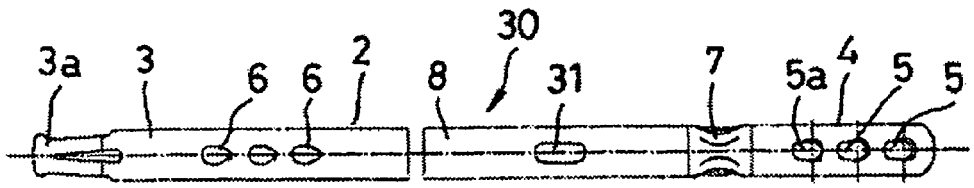
FIG. 9 is a plan view of the boot-band in Embodiment 2.
Figure 10:
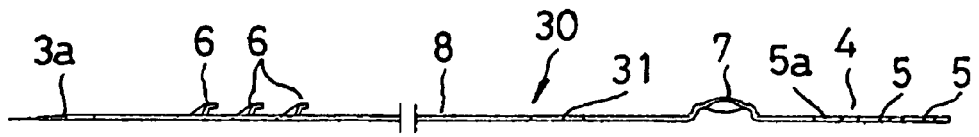
FIG. 10 is a side elevation view of a boot-band in Embodiment 2.

FIG. 8 is a graph that shows the load-elongation (curve K) of the engagement hole 5a, together with the load-elongation (curve L) of the general part 8. The elongation of the entire boot-band is 6.86 mm. In this embodiment, this elongation is borne by both the length of the general part 8, 188 mm (195−7=188 mm), and the length of the engagement hole 5a, 7 mm. In FIG. 8, when the tension of the boot-band is about 3300 N, the elongation rate of the engagement hole 5a is about 9%. Because the length of the engagement hole 5a is 7 mm, the engagement hole 5a elongates by about 0.63 mm. However, at the same load, the elongation rate of the general part 8 is about 3.4%, and the length of the general part 8 is 188 mm, and therefore the elongation of the general part 8 is 6.23 mm. The sum of these elongations—i.e., 6.86 mm—is the elongation of the entire boot-band.

In this case, although the general part 8 has a small elongation rate, its circumference is long, and therefore its elongation becomes large. Thus, because the general part 8 also elongates, the engagement hole 5a does not need to elongate more than is indicated above in order to secure a sufficient elongation.

However, at the time of breakage of the boot-band, the contact force is 6 N/mm² or more, and from the above-mentioned Formula 1, the tension of the band is 4200 N. From FIG. 8, at this time, the engagement hole 5a elongates by 1.41 mm at an elongation rate of 20.1%, and the general part 8 elongates by 18.87 mm at an elongation rate of 10.2%; therefore the boot-band as a whole can elongate by 20.28 mm. This elongation is large enough with regard to the distance between the leg portions 7a of the ear portion 7, which is 10 mm. For this reason, the boot-band 1 will not break.

The above will now be explained in order of the steps involved in compressing the boot-band. The contact force required to prevent leakage of grease is 1050 N, and the yield-point load of the engagement hole 5a is 1706 N; thus the tension required for the boot-band can be obtained. Furthermore, as the boot 20 continues to be compressed, the load to elongate the engagement hole 5a—caused by the boot's reaction force—becomes larger than 1706 N, and the engagement hole 5a starts to elongate due to plastic deformation.

When the boot is further compressed, the engagement hole 5a continues to elongate due to plastic deformation, and the boot's reaction force becomes larger; as a result, the load to elongate the boot-band 1 reaches 2200 N. At this point, the general part 8 also starts to elongate due to plastic deformation. The load at which the boot breaks is 4200 N. Because the general part 8 elongates sufficiently due to plastic deformation before the load reaches this value of 4200 N, the boot does not break even when the leg portions 7a—the distance between which is 10 mm—of the ear portion 7 tightly contact each other.

Sufficient compression volume—for obtaining the contact force necessary to prevent leakage of grease—of the boot 20 varies according to differences in the characteristics of its components. For example, when the hardness of a boot is low, the compression volume of the boot should be large so as to obtain the same specified contact force. Comparing two cases where the hardness of a boot is low and where it is high, at the same compression volume the boot-reaction force is lower for the boot having little hardness, and thus the load that acts to elongate a boot-band becomes less with such a boot. That is to say, due to the relation between the load to elongate a boot-band and the boot-band's tensile strength that resists elongation, the compression volume needed to start elongation by plastic deformation of the engagement hole 5a becomes larger in the case of a boot having little hardness. Accordingly, in light of the balance between a boot's reaction force and a boot-band's tensile strength, it is possible that, by restraining the tensile strength of the boot-band, the boot's reaction force can also be restrained. The tensile strength of a boot-band depends on the cross-sectional area of the engagement hole 5a, and therefore, when the tensile strength is determined, the force to elongate the boot-band can also be determined.

The force needed to elongate the boot-band 1 is determined by the boot's reaction force, as shown by the aforementioned Formula 1, and the relationship is such that the boot-reaction force equals the spring constant of the boot multiplied by the compression volume. Therefore, if the rigidity of a boot is high (i.e., the boot's hardness is high), the boot-reaction force becomes large, and the boot-band begins to elongate at a low compression volume. However, when the rigidity of the boot is low, the boot-reaction force does not become large unless the compression volume is made large, and thus the boot-band will not begin to elongate if the compression volume is low. In this way, even if the characteristics of the components vary, only the elongation of the boot-band changes; therefore, the required contact force remains constant, and the function of preventing grease leakage remains the same. Also, even if the hardness of a boot is high, because the engagement hole 5a starts to elongate when the compression volume of the boot is small, the boot will not be clamped excessively.

In such an embodiment, because when the boot-band 1 is clamped there is elongation not only of the engagement hole 5a, as a part of a smaller-cross-sectional area, but also of the general part 8 due to plastic deformation, stable sealing can be secured so as to prevent the leakage of grease. Also, because of this, a wide range of tolerance can be obtained without having to make the engagement hole 5a long. Furthermore, elongation of both the engagement hole 5a and the general part 8 due to plastic deformation does not excessively clamp the boot 20, and thus the boot 20 does not break. Also, because a wide range of tolerance can be obtained by using the engagement hole 5a that is formed in the outer overlap portion 4, there is no need to form another opening as in the case of the boot-band described in Japanese Unexamined Published Patent Application No. H8-170773.

Embodiment 2

FIGS. 9 through 12 show a boot-band 30 in Embodiment 2. The boot-band 30 in this embodiment is constituted such that an opening 31 is formed in the boot-band 1 of Embodiment 1.

Figure 11:
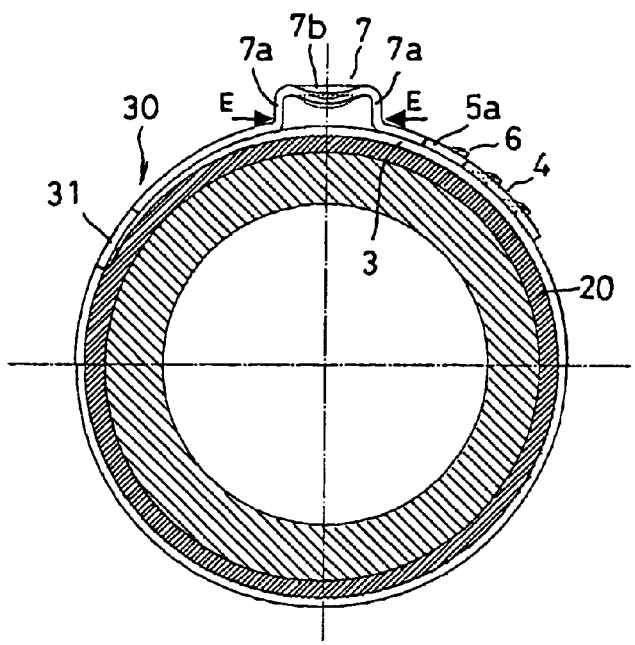
FIG. 11 is a cross-section view of the boot-band of Embodiment 2 before clamping.

The opening 31 is formed as a rectangular shape, positioned adjacent to the ear portion 7 of the belt-shaped member 2. When the belt-shaped member 2 is wound like a ring, as shown in FIG. 11, the opening 31 is positioned in the outer overlap portion 4, and it does not contact the boot 20. Accordingly, the opening 31 does not bite into the boot 20. The opening 31 is formed by punching at a predetermined portion of the belt-shaped member 2, and the opening 31 serves as a smaller-cross-sectional area that elongates when the boot-band 30 is clamped.

In this embodiment, as is similar to Embodiment 1, a plurality of engagement holes 5, 5a are formed on the outer overlap portion 4 of the belt-shaped member 2, and a plurality of engagement prominences 6 that are to be engaged with the engagement holes 5, 5a are formed on the inner portion 3 of the belt-shaped member 2. Among the plurality of the engagement holes, the engagement hole 5a, which is positioned on the side of the ear portion 7, acts as a smaller-cross-sectional area, as is similar with Embodiment 1. Accordingly, in this embodiment, both the opening 31 and the engagement hole 5a serve as smaller-cross-sectional areas.

In this embodiment, at the stage when the ear portion 7 is initially clamped, because the load does not exceed the yield-point loads of either the engagement hole 5a or the opening 31, the tensile strength of the belt-shaped member 2 is larger than the boot's reaction force, and therefore, the boot 20 can be compressed. When the ear portion 7 is clamped so as to enlarge the clamping force, the boot's reaction force increases. At the time that the boot's reaction force becomes larger than the yield-point loads of both the engagement hole 5a and the opening 31, the engagement hole 5a and the opening 31 elongate by plastic deformation. During this elongation, the force for clamping the boot-band 30 is further increased. Thus, when the force exceeds the yield-point load of the general part 8, the general part 8 elongates by plastic deformation. This elongation of the general part 8 due to plastic deformation prevents the increase of the boot compression volume, and the boot 20 is not compressed excessively.

With regard to the above-mentioned clamping, when only the engagement hole 5a and the opening 31 elongate—after the boot 20 is compressed so as to reach the level of the contact force that is required to prevent leakage of grease—both a part of the engagement hole 5a and a part of the opening 31 reach an excessive degree of elongation, as a result of which the boot-band breaks. Therefore, in this embodiment, also, conditions (Conditions 21 and 22 below) are set in order that the general part 8 is elongated by plastic deformation, and so that breakage of the boot-band is prevented.

Condition 21: The tension that arises from a boot's reaction force that is (1) due to clamping and (2) acts on both an engagement hole 5a and an opening 31 is equal to or greater than the yield-point load of the general part 8.

Condition 22: The cross-sectional areas of both an engagement hole 5a and an opening 31 multiplied by the breaking strengths of both the engagement hole 5a and the opening 31 are equal to or greater than the cross-sectional area of the general part 8 multiplied by the yield-point strength of the general part 8.

By setting Condition 21, when the boot-reaction force acts on the boot-band 1, the general part 8 can be elongated by plastic deformation. By setting Condition 22, breakage of the boot-band is prevented. Thereby, not only does the engagement hole 5a and the opening 31, as smaller-cross-sectional areas, elongate, but also the general part 8 elongates, so that the boot 20 can be clamped without breaking the boot-band.

Specific numeric values in one example of this embodiment will now be presented.

The belt-shaped member 2 is 0.8 mm thick and 10 mm wide, and it has a radius of 15 mm when it is in a ring-like shape. The distance between the leg portions 7a is 10 mm; the opening 31 is 3.5 mm wide and 7 mm long; the diameter of each of the engagement holes 5, 5a is equal to the width of the opening 31. SUS430 that has a yield-point load of 240 N/mm$^2$ and a breaking strength of 590 N/mm$^2$ is used as the material of the belt-shaped member 2, and the breaking elongation thereof is 32%. The boot-band 30 of this embodiment clamps and fixes the boot 20 on—among metallic members shown in FIG. 4—the metallic member 22. The material of the boot 20 is polyester elastomer that has a hardness of 47 D. The part 20b to be fixed onto the metallic member 22 is about 2 mm thick, 1.5 N/mm$^2$ in terms of contact force for preventing leakage of grease, and 6 N/mm$^2$ in terms of contact force that could break the boot.

In this embodiment, when the ear portion 7 is clamped and fastened so as to make the leg portions 7a contact each other—while the radius of the ring-like shape is 15 mm—the boot is compressed 0.9 mm. Therefore, the elongation of the boot-band 30 is expressed as 10−π×0.9×2=4.35 mm. If this elongation is borne only by the opening 31 and the engagement hole 5a as smaller-cross-sectional areas, it is calculated as 4.35 mm/(length of the opening 31: 7 mm+length of the engagement hole 5a: 7 mm)=31%, which is almost equal to elongation that causes breakage of the boot-band 30, and thus there is a risk of breakage.

Figure 12:
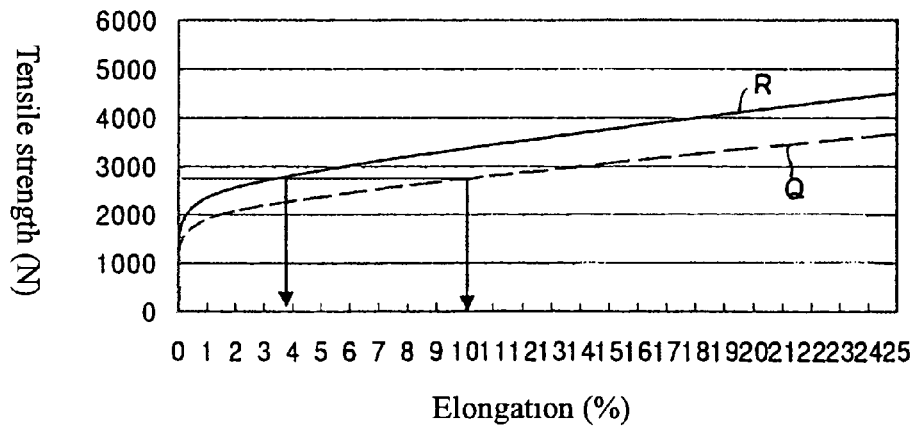
FIG. 12 is a graph that shows the elongation of the boot-band in Embodiment 2.
Figure 13:
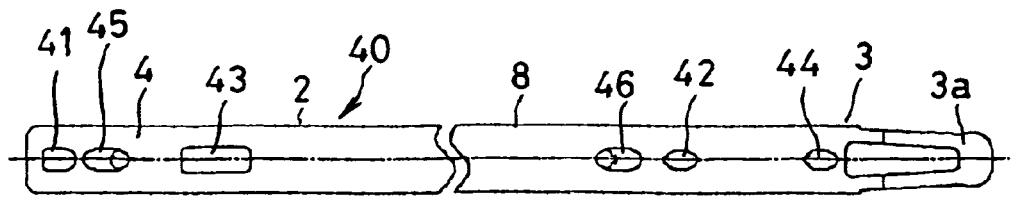
FIG. 13 is a plan view of the boot-band of Embodiment 3.
Figure 14:
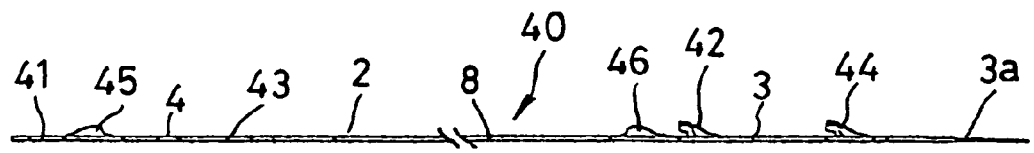
FIG. 14 is a side elevation view of the boot-band of Embodiment 3.

FIG. 12 is a load-elongation graph that shows (1) the load elongation (curve Q) of both the opening 31 and the engagement hole 5a (2) the load elongation (curve R) of the general part 8 in this embodiment. The yield-point load of the opening 31 is increased by about 25% due to the hardening work, which also can be seen in FIG. 12. The elongation of the boot-band 30 as a whole, generated by the aforementioned maximum clamping, is 4.35 mm. When this elongation is borne by (1) the general part 8 having a length of 94.2 mm−14.0 mm=80.2 mm, (2) the opening 31 having a length of 7 mm, and (3) the engagement hole 5a having a length of 7 mm, then the elongation of both the opening 31 and the engagement hole 5a is about 10% at a band tension of about 2750 N. The length of both the opening 31 and the engagement hole 5a is 7 mm, and the opening 31 and the engagement hole 5a elongate by about 0.7 mm. However, elongation of the general part 8—which is 80.2 mm long—is about 3.7% at the same load, and therefore, the elongation of the general part 8 is 2.97 mm.

In this embodiment, when the boot-band 1 is clamped, the general part 8, in addition to the opening 31 and the engagement hole 5a, is elongated by plastic deformation, whereby stable sealing can be secured and leakage of grease can be prevented. Furthermore, a wide range of tolerance can be obtained without elongating the opening 31 and the engagement hole 5a (especially the opening 31). Moreover, elongation due to plastic deformation does not cause excessive clamping on the boot 20, and thus the boot 20 does not break.

In this embodiment, the lengths of both the opening 31 and the engagement hole 5a can be shortened so they can be formed in the outer overlap portion 4, and the opening 31 and the engagement hole 5a do not directly contact with the boot 20. Therefore, the opening 31 and the engagement hole 5a do not bite into the boot 20, and thus when the boot-band 30 is clamped, the boot 20 is not dragged or moved in the direction of the clamping. Accordingly, the thickness of the boot 20 as a whole can be made constant, tight contact of the boot 20 against the metallic member 22 is improved, and sealing effectiveness is increased.

Furthermore, because the opening 31 and the engagement hole 5a as parts of the smaller-cross-sectional areas are formed in the outer overlap portion 4, the smaller-cross-sectional areas are not brought into direct contact with the boot 20. Therefore, the clamping force can be applied uniformly around the boot 20, without partially deteriorating the contact force against the boot 20. Thereby, a certain level of sealing effectiveness can be secured.

In contrast with the boot-band 30 of the above-mentioned embodiment, the boot-band described in the aforementioned Japanese Unexamined Published Patent Application No. H8-170773 must have a long opening for the purpose of achieving a wide range of tolerance, and therefore, the opening cannot be formed on the outer overlap portion where an engagement hole and the like exist, and inevitably the opening must be formed in a portion that contacts directly with the boot. Therefore, when the boot-band is clamped, the opening bites into the boot and is dragged, and thus, the thickness of the boot becomes uneven. Furthermore, because the contact force on the boot is partially deteriorated at the area where the opening is formed, the clamping force cannot act uniformly on the entire periphery of the boot.

Furthermore, in the present invention, the opening 31 and the engagement hole 5a (especially the opening 31) do not have to be formed in the outer overlap potion 4, and they can be formed in any part of the belt-shaped member 2. For example, if the opening 31 is formed in a portion that contacts the boot 20, the side of the boot 20 is formed so as to have a shear droop surface, so that the friction generated between the boot-band 30 and the boot 20 can be reduced.

Embodiment 3

FIGS. 13 through 17 show a boot-band 40 in Embodiment 3. On the side of the outer overlap portion 4 of the boot-band 40, a lock hole 41, a projection 45, and a tack hole 43 are formed in that order from the opening-side end (the left end in FIGS. 13 and 14) in a lengthwise direction (to the right). Also, on the side of the inner portion 3 of the belt-shaped member 2, a projection 46, a locking projection 42, and a connecting projection 44 are formed in that order from the side of the outer overlap portion in the lengthwise direction (to the right).

By the clamping action of the boot-band 40, the lock hole 41 and the locking projection 42 are engaged with each other and maintain a clamping condition; these therefore act as a clamping means. The tack hole 43 and the connecting projection 44 are engaged with each other, so that the belt-shaped member 2 is temporarily tacked in a ring-shape condition. Also, as the tack hole 43 is formed into a rectangular shape, it acts to prevent displacement in the width direction at the time of the clamping action of the boot-band 40, and it also acts so as to prevent excessive compression of the boot 20.

Figure 15:
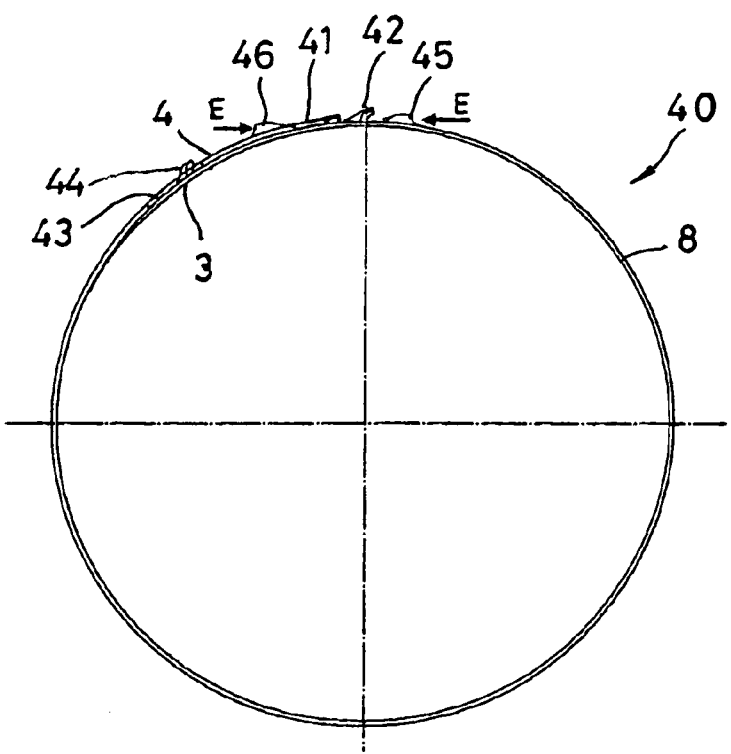
FIG. 15 is a side elevation view of the boot-band of Embodiment 3 before clamping.
Figure 16:
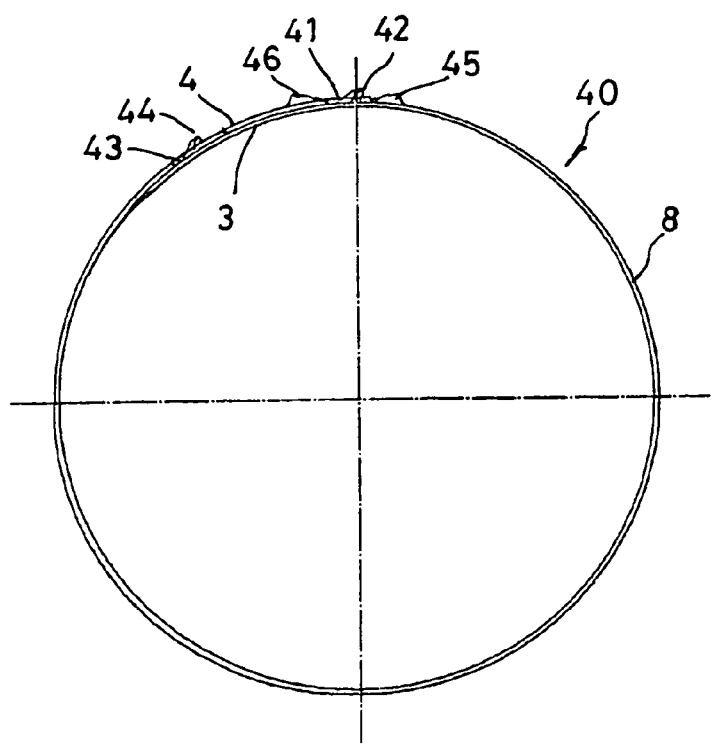
FIG. 16 is a side elevation view of the boot-band of Embodiment 3 after clamping.

The projections 45, 46 are used to perform clamping—using a tool dedicated for that purpose—so that the clamping force acts is directed in such a way that the prominences 45, 46 approach each other, and so that the length of the boot-band 40 is shortened. FIG. 15 shows a ring-shaped condition when the connecting projection 44 is engaged with the connection hole 43. Under this condition, the clamping force acts on the projections 45, 46 in the directions indicated by the arrows E. FIG. 16 shows the condition when the locking projection 42 is engaged with the lock hole 41 by this clamping, in which the required compression force can act on the boot 20.

In this embodiment, the tack hole 43 serves as a smaller-cross-sectional area that elongates due to plastic deformation at the time of clamping, and other portions of the belt-shaped member 2 serve as the general part 8, whose cross-sectional area is not decreased. In addition, the lock hole 41 is positioned at the outermost end of the outer overlap portion 4, and therefore the clamping force does not act on the lock hole 41. As a result, the lock hole 41 does not elongate at the time of clamping.

In this embodiment, at the initial stage of clamping the boot 20, because the clamping force is smaller than the yield-point load of the tack hole 43, the tensile strength of the belt-shaped member 2 remains larger than the boot-reaction force, and thus, the boot can be compressed. When the distance between the projections 45, 46 is reduced further, both the boot-reaction force and the load on the tack hole 43 are increased. When the load becomes larger than the yield-point load of the tack hole 43, the tack hole 43 is elongated due to plastic deformation. During such elongation, the force to clamp the boot-band 40 is further increased. When the force exceeds the yield-point load of the general part 8, the general part 8 is elongated by plastic deformation, and thus the boot can be compressed.

In the aforementioned clamping, when only the connection hole 43 elongates after the level of contact force required to prevent leakage of grease is reached, the connecting hole 43 elongates excessively and the boot-band breaks. Therefore, in this embodiment also, conditions (Conditions 31 and 32 below) are set, so that the general part 8 is elongated due to plastic deformation, and thus excessive elongation of the connection hole 43 and breakage of the boot-band are prevented.

Condition 31: The tension that arises due to the boot-reaction force that (1) is caused by clamping and (2) acts on the tack hole 43, is equal to or greater than the yield-point load of the general part 8.

Condition 32: The cross-sectional area of the tack hole 43 multiplied by the breaking strength of the tack hole 43 is equal to or greater than the cross-sectional area of the general part 8 multiplied by the yield-point strength of the general part 8.

By setting Condition 31, when the boot-reaction force acts on the boot-band 1, the general part 8 can be elongated by plastic deformation. By setting Condition 32, excessive elongation of the connection hole 43 and breakage of the boot-band are prevented. Thereby, not only the tack hole 43 as a smaller-cross-sectional area is elongated, but also the general part 8 is elongated, so that the boot can be clamped without excessive elongation of the connection hole 43 and breakage of the boot-band.

Specific numeric values in one example of this embodiment will now be presented.

The belt-shaped member 2 is 0.8 mm thick and 9 mm wide, and it has a radius of 40 mm when it is in a ring-like shape. The distance between the projections 45, 46 is 21.5 mm in a temporarily tacked condition, and is 15 mm in an engagement condition, the difference between which (i.e., 6.5 mm) is the clamping length in this embodiment. The tack hole 43 is 3 mm wide and 10 mm long. SUS304 having a yield-point load of 220 N/mm$^2$ and a breaking strength of 690 N/mm$^2$ is used as the material of the belt-shaped member 2. The boot-band 40 of this embodiment clamps and fixes the boot 20 against a metallic member 21—among the metallic members shown in FIG. 4—and the material of the boot 20 is polyester elastomer having a hardness of 44 D.

Also, the fixing-portion end 20a that is to be fixed onto the metallic member 21 is about 1.25 mm thick, the contact force for preventing leakage of the grease is 1.5 N/mm$^2$, and the contact force that breaks the boot is 6 N/mm$^2$.

In this embodiment, the projections 45, 46 are clamped so that they approach each other. When the maximum clamping distance is 6.5 mm, the compression volume of the boot is 0.4 mm, and the elongation of the boot-band 40 is expressed as 6.5−π×0.4×2=3.99 mm. When this elongation is borne only by the tack hole 43 as a smaller-cross-sectional area, the elongation rate is expressed as 3.99 mm/10 mm (length of the tack hole 43)=39.9%, as a result of which there is a risk of breaking the boot-band. Accordingly, in this embodiment also, the elongation of the boot-band is borne by both elongation of the tack hole 43 and elongation of the general part 8 by plastic deformation.

Figure 17:
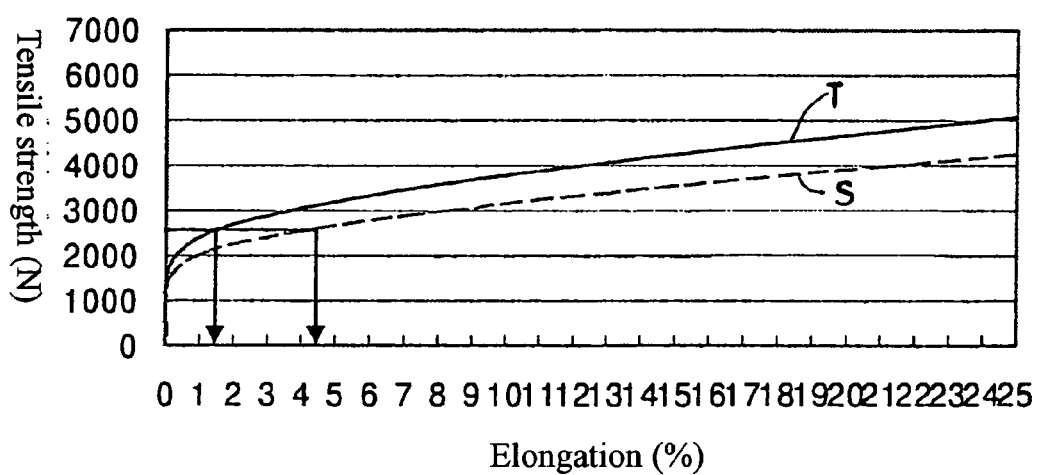
FIG. 17 is a graph that shows the elongation of the band of Embodiment 3.

FIG. 17 is a graph that shows the load elongation (curve S) of the tack hole 43 and the load-elongation (curve P) of the general part 8 in this embodiment. When the tension of the boot-band 40 is about 2600 N, the elongation rate of the tack hole 43 is about 4.5%, and the length thereof is 10 mm; therefore the tack hole 43 elongates by about 0.45 mm.

However, at the same load, the elongation rate of the general part 8, whose length is 244 mm, is about 1.45%, and thus the elongation thereof is 3.54 mm. The sum of these corresponds to the elongation of the boot-band 40 as a whole.

Also, in this embodiment, because both the tack hole 43 as a smaller-cross-sectional area and the general part 8 are elongated by plastic deformation to clamp the boot 20, a wide range of tolerance can be obtained. Also, because the boot 20 is not compressed excessively, breakage of the boot can be prevented. Also, because the general part 8 elongates, constant contact force on the boot can be secured without having to make the tack hole 43 needlessly long, and good sealing can be performed.

INDUSTRIAL APPLICABILITY

As describe above, according to the present invention, because both the smaller-cross-sectional area and the general part elongate by plastic deformation, not only a wide range of tolerance can be obtained but also breakage of the boot can be prevented without excessively clamping the boot, and also breakage of the boot-band can be prevented. Moreover, because the general part elongates, it is not necessary for only the smaller-cross-sectional area to bear the elongation. Therefore, (1) the smaller-cross-sectional area does not have to be made long, (2) the contact force on the boot is not deteriorated, and (3) constant contact force that tightly acts on the boot can be obtained.

What is claimed is:

1. A boot-band which is adapted to be wound around an outer periphery of a boot in a ring-shaped condition so that a first end portion overlaps a second end portion and so that a belt-shaped member is formed, said boot-band comprising:
a plurality of engagement holes formed in the first end and a plurality of engagement prominences which are formed on an overlapped portion of the second end and which are arranged to each engage in a connection hole, a smaller-cross-sectional area portion proximate an end of the first end portion, which elongates in response to a clamping force applied in a direction to shorten a circumferential length of said belt-shaped member, wherein:
said smaller-cross-sectional area portion includes a hole which is different from the engagement holes, which is so configured and arranged as to remain prominence free, which is elongate and which provides elongation in response to the application of the clamping force, the boot-band further comprising:
a general part, the cross-sectional area of which is not decreased, the general part being formed in a part of the first end portion and spaced from the smaller-cross-sectional area portion, and
wherein both said smaller-cross-sectional area portion and said general part are configured to elongate in response to the clamping force being applied, and wherein said belt-shaped member is such that:
a tension that arises due to a boot-reaction force that (a) is caused by the clamping force and (b) acts on the smaller-cross-sectional area portion, is equal to or greater than a yield-point load of the general part; and
a cross-sectional area of the smaller-cross-sectional area portion multiplied by a breaking strength of the smaller-cross-sectional area portion, is equal to or greater than the cross-sectional area of the general part multiplied by a yield-point strength of the general part.

2. A boot-band as set forth in claim 1, wherein said smaller-cross-sectional area is formed in the outer overlap portion of the boot-band.

3. The boot-band of claim 1, further comprising a second hole which is different from the engagement holes, which is so configured and arranged as to remain prominence free, which is elongate and which provides elongation in response to the application of the clamping force.

4. The boot-band of claim 3, wherein the second hole is elongatable in a longitudinal direction of said band and is disposed in a general part of the band at a location distal from the first said hole which is different from the engagement holes.

5. The boot-band of claim 3, further comprising a deformable ear which is disposed between the second hole and the first said hole which is different from the engagement holes.

6. The boot-band of claim 1, further comprising a raised portion adapted to be clamped by a tool upon fixing said boot-band on a boot.

7. The boot-band of claim 6, further comprising an elongated hole formed between the raised portion and said inner portion to define said smaller cross sectional area.

8. The boot-band of claim 7, further comprising a plurality of engagement holes in said outer overlap portion and a plurality of matching engagement projections in said inner portion, wherein said raised portion is positioned between said engagement holes and said elongated hole.

9. The boot-band of claim 1, wherein an end of said inner portion has thickness that gradually reduces in a direction away from said outer overlap portion.

10. The boot-band of claim 1, further comprising an elongated tack hole and a matching connecting portion engageable with the tack hole to temporarily maintain the band in the ring shape state, said tack hole defines said smaller cross sectional area.

11. The boot-band of claim 10, wherein said tack hole is rectangular.

12. The boot-band of claim 10, further comprising
at the upper overlapping end, a locking hole, a first clamping projection and said tack hole; and
at the lower overlapping end, a locking projection engageable with said locking hole, a second clamping projection and said connecting portion;
wherein, when said band is in the ring shape state, said locking hole and locking projection are positioned between said clamping projections which are adapted to be clamped by a tool upon fixing said band to a boot.

13. In combination, a structural member, a boot covering at least partially the structural member, a boot band as claimed in claim 1, and a clamping tool fastening said boot band and, hence, said boot to said structural member.

14. The combination of claim 13, wherein said boot band includes a hole defining said smaller cross sectional area, said boot band being free of direct physical contact with said boot in the vicinity of said hole.

15. The combination of claim 13, wherein said boot band includes two longitudinally spaced clamping projections which are brought closer to each other by said clamping tool.

16. The combination of claim 13, wherein said boot band includes two longitudinally spaced clamping projections which are brought into contact with each other by said clamping tool.

* * * * *